United States Patent [19]

Nakayama

[11] Patent Number: 4,982,316
[45] Date of Patent: Jan. 1, 1991

[54] POLYPHASE FULL-WAVE RECTIFYING CIRCUIT

[75] Inventor: Hirofumi Nakayama, Kimitsu, Japan

[73] Assignee: Kabushiki Kaisha Toshiba, Kawasaki, Japan

[21] Appl. No.: 433,853

[22] Filed: Nov. 9, 1989

[30] Foreign Application Priority Data

Nov. 12, 1988 [JP] Japan .................... 63-286089

[51] Int. Cl.$^5$ ................ H02M 7/06; H02H 7/125
[52] U.S. Cl. ................ 363/53; 363/126; 323/231; 361/21
[58] Field of Search .......... 363/52, 53, 87, 126, 363/129; 323/229, 231; 361/20, 21, 56, 91, 111, 118

[56] References Cited

U.S. PATENT DOCUMENTS

| | | | |
|---|---|---|---|
| 3,551,781 | 12/1970 | Smith | 363/53 |
| 3,911,324 | 10/1975 | Bishop | 363/52 |
| 4,347,543 | 8/1982 | Frister et al. | 363/53 |
| 4,808,866 | 2/1989 | Kawazoe et al. | 363/126 |

FOREIGN PATENT DOCUMENTS

44-4451 2/1969 Japan ...................... 363/126

Primary Examiner—Peter S. Wong
Attorney, Agent, or Firm—Foley & Lardner, Schwartz, Jeffery, Schwaab, Mack, Blumenthal & Evans

[57] ABSTRACT

A polyphase full-wave rectifying circuit that is connected to a polyphase AC line having a neutral point includes DC output terminals and plural pairs of rectifying elements. Each pair is composed of two rectifying elements in series and these pairs are connected in parallel with each other between the DC output terminals. One of the pairs of rectifying elements is a pair of Zener type rectifying elements and the interconnection point of this pair is to the neutral point of the polyphase AC line. The other pairs are pairs of ordinary type rectifying elements, each interconnection point of these pairs is to each phase point of the polyphase AC line. Both internal surges and external surges are absorbed through the pair of Zener type elements. Therefore, the clamping voltages of the internal and external surges results in the same level, being twice as high as the Zener voltage. The peak voltage applied to one Zener type element reduces by half the surge peak voltage.

1 Claim, 5 Drawing Sheets

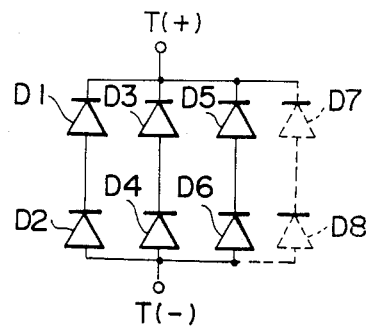
FIG. IA
PRIOR ART
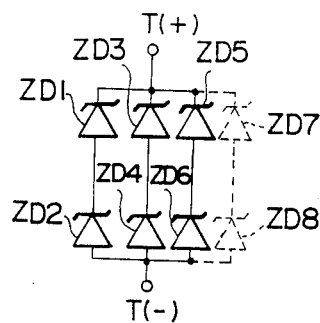
FIG. IB
PRIOR ART
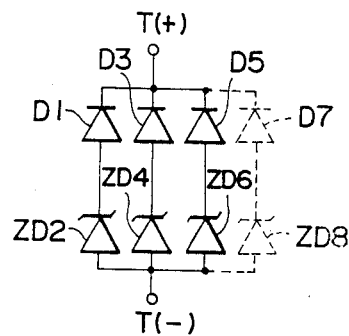
FIG. IC
PRIOR ART
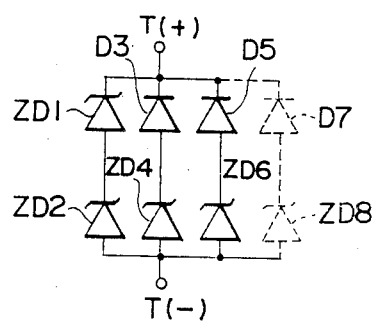
FIG. ID
PRIOR ART

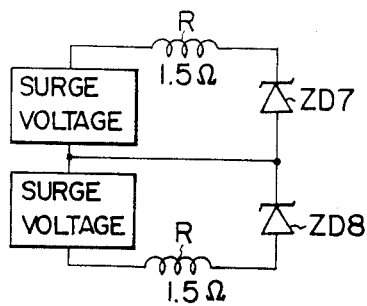
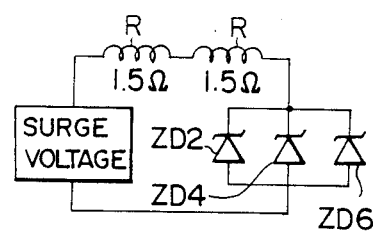
FIG. 6A              FIG. 7A
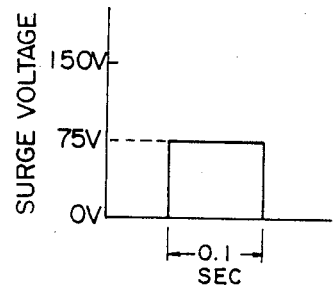
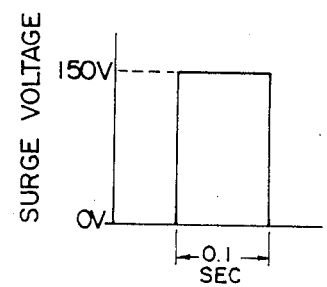
FIG. 6B              FIG. 7B

POLYPHASE FULL-WAVE RECTIFYING CIRCUIT

BACKGROUND OF THE INVENTION

This invention relates to polyphase full-wave rectifying circuits used between a polyphase AC line having a neutral point and a DC line, and more particularly to a circuit configuration which allows the absorption of surges developed on the AC or DC side and is preferably applicable, for example, to rectifying circuits between three-phase AC generators and regulators for automobile.

FIGS. 1A to 1D are examples of conventional three-phase full-wave rectifying circuits set between an AC generator (Y-connection three-phase synchronous generator) and a regulator of an automobile.

FIG. 1A is a basic bridge-type three-phase full-wave rectifying circuit using ordinary diodes D1–D6 as rectifying elements for each one of the 6 arms. The configuration incorporating 6 rectifying elements in one rectifying circuit is generally referred to as the six-in-one type. Another configuration that has two more arms provided with diodes D7 and D8 designated by dashed lines, and an interconnection point which is connected to the neutral point of an AC line is also well known. The configuration equipped with such rectifying elements for the neutral point is generally called the eight-in-one type. The eight-in-one type has the advantage of generating 10% more power than the six-in-one type.

This basic bridge-type three-phase full-wave rectifying circuit shown in FIG. 1A has a disadvantage of an inability to absorb surges developing both inside and outside of the generator. Surges are classified into load damping surges (called internal surge) developing inside the generator at the time when a load and a capacitor (Battery) are disconnected, and other surges such as ignition surges developing outside the generator (and called external surges). In the circuit shown in FIG. 1A, neither internal surges nor external surges can be absorbed and some surges may break rectifying elements and other electronic circuits.

FIG. 1B is a first example of conventional circuit configurations having a larger surge absorptivity. In this circuit, Zener diodes ZD1–ZD6 (ZD7 and ZD8 can be added) are used as rectifying elements for all arms, allowing internal and external surges to be absorbed. This circuit, however, has disadvantage in that it requires a number of expensive Zener diodes.

FIG. 1C is a second example of a conventional circuit configuration which can absorb surges. All the diodes used on the positive output terminal T(+) side are ordinary diodes D1, D3 and D5 (with D7 optional), and only on the negative output terminal side are T(−) Zener diodes ZD2, ZD4, and ZD6 (with ZD8 optional) used. Although this configuration can decrease the number of Zener diodes, external surges remain without being absorbed in return.

FIG. 1D is a third example of a conventional circuit configuration which decreases the number of Zener diodes and still can absorb external surges. In this configuration all the diodes on the negative output terminal T(−) side, ZD2, ZD4 and ZD6 (with ZD8 optional), and one of the diodes on the positive output terminal side T(+) ZD1 are Zener diodes. This configuration can absorb both the internal and external surges, but still has a considerable number of Zener diodes.

As described above the conventional polyphase full-wave rectifying circuit which can absorb internal and external surges still involve problems of having to use a considerable number of Zener diodes.

It is another problem that the surge clamping voltage level for the internal surges (measured between the output terminals) differs from that for external surges. As defined in FIGs. 1B and 1D, internal surges are clamped by one Zener diode ZD2, ZD4 or ZD6 at each phase, while external surges are clamped by two Zener diodes ZD1 and ZD2 connected in series. Therefore the clamping voltage for internal surges results in the same level as that of the Zener voltage, and that for external surges becomes twice as high as that of the Zener voltage. This difference in the clamping voltage level makes these conventional circuits very difficult to use.

Furthermore, in the eight-in-one type, for ease of assembly, rectifying elements generally used for the neutral point have the same capacity as that of other rectifying elements. However in practice, since the current flowing into the rectifying elements for the neutral point is only about one tenth the strength of that flowing into other rectifying elements, it can be said that the elements for the neutral point are not being effectively used.

SUMMARY OF THE INVENTION

An object of this invention is to provide a polyphase full-wave rectifying circuit which can absorb both internal and external surges by means of as few Zener diodes as two.

Another object of this invention is to provide an improved rectifying circuit which can clamp internal and external surges at the same voltage level.

A further object of this invention is to provide an effective use of the rectifying elements connected to the neutral point.

A still further object of this invention is to reduce the absorption peak power per Zener diode at the time of absorbing surges, and thus realize greater resistance to surges than that of a conventional circuit.

The rectifying circuit of this invention has plural pairs of rectifying elements, each pair of which is composed of two rectifying elements in series connection and the pairs are connected in parallel with each other between DC output terminals. One pair is a pair of Zener type rectifying elements, and the interconnection point of the pair is to be connected to the neutral point of the polyphase AC line. The other pairs are pairs of ordinary type (non-Zener type) rectifying elements and each interconnection point of the pair is to be connected to each phase point of the polyphase AC line.

In the above configuration, both the internal and external surges are absorbed through the serial connection of two Zener type elements to which the neutral point is connected. Therefore both the clamping voltages for internal surges and for external surges are the same voltage level which is twice as high as the Zener voltage level of the element.

When surges are developed, a voltage level of half the surge voltage level is applied to each of two Zener type elements. Thus, the peak voltage level applied to one Zener type element is half the surge peak voltage. Furthermore as described above, the Zener voltage level is half the clamping voltage level. On the other hand, in the conventional circuit, the level of the peak voltage applied to one Zener type element is the same as that of surge peak voltage, and the Zener voltage is on the same level as the clamping voltage. Because of this difference, the absorption peak power per Zener type element in the circuit of this invention is reduced to half that of the conventional circuit, thus increasing the resistance to surges. Furthermore, Zener type elements can be effectively used for absorbing surges.

BRIEF DESCRIPTION OF THE DRAWINGS

FIGS. 1A to 1D are examples of conventional polyphase full-wave rectifying circuits;

FIGS. 6A and 6B are the equivalent circuit and the surge waveform of the model adopted to obtain the absorption peak power per Zener diode in the embodiment;

FIGS. 7A and 7B are the equivalent circuit and the surge waveform of the model adopted to obtain absorption peak power per Zener diode in the conventional circuit shown in FIG. 1D.

DESCRIPTION OF THE PREFERRED EMBODIMENT

Figure 2:
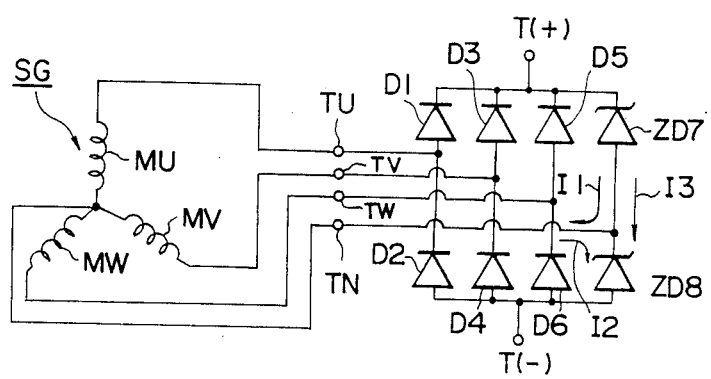
FIG. 2 is a circuit showing an embodiment of the polyphase full-wave rectifying circuit according to this invention.

FIG. 2 shows an embodiment of polyphase full-wave rectifying circuit according to this invention.

This embodiment is an application of the invention to a rectifying circuit for an automobile battery charging circuit. The generator used in the embodiment is a three-phase synchronous generator SG which has stator coils MU, MV and MW, connected to output terminals TU, TV and TW.

The rectifying circuit comprises a bridge-type three-phase full-wave rectifying circuit having 6 general-type diodes D1–D6, and a series connection of two Zener diodes ZD7 and ZD8 connected to the neutral point and further connected between the DC output terminals in parallel. The U-phase output terminal TU of the generator SG is connected to the interconnection point of diodes D1 and D2, the V-phase output terminal TV of the generator SG to that of diodes D3 and D4, and the W-phase output terminal TW of the generator SG to that of diodes D5 and D6. Furthermore, the neutral point TN of the generator SG is connected to the interconnection point of Zener diodes ZD7 and ZD8. The series connections of two Zener diodes are connected in parallel with the cathode connected to the positive output terminal T(+) and the anode connected to the negative output terminal T(−) of the rectifying circuit. Between the DC output terminals T(+) and T(−), various DC loads and a battery (not illustrated in the drawing) are connected.

In the embodiment, the voltage between the DC output terminals T(+) and T(−) of this rectifying circuit is regulated so as to maintain 12V, while the Zener voltage of Zener diodes ZD7 and ZD8 is set, for example, to 15V.

This configuration absorbs the surges in the following manner. The load damping surges developing in the generator, for example, are absorbed as described below. The surge current of the U-phase surge developing in the stator coil MU goes through the path which runs from the terminal TU to the neutral point via general diode D1 and Zener diode ZD7 in accordance with the polarity as shown by the current I1, or goes through the path from the neutral point TN to the terminal TU via Zener diode ZD8 and the general diode D2 as shown by the current I2. On the other hand, though the V- and W-phase surge currents also flow as currents I1 and I2, there are phase differences of 120 degrees and 240 degrees between them and the U-phase current respectively. When these three phases are balanced, the internal surge current, which is the vector synthetic surge current of these three surge currents, divides into current I1 and current I2 of the equal intensity, and flows into the Zener diodes ZD7 and ZD8 respectively. It is to be understood that the Zener diodes ZD7 and ZD8 absorb the internal surge energy half-and-half. Surge currents of external surges such as ignition surges applied between T(+) and T(−) flow through the path which runs from the terminal T(+) to the terminal T(−) via Zener diodes ZD7 and ZD8 in the same manner as is the current I3. It is to be understood also that the Zener diodes ZD7 and ZD8 absorb the external surge energy half-and-half as in the case of internal surge.

As set forth above, the surge currents of both internal and external surges go through two Zener diodes ZD7 and ZD8. Therefore, the clamping voltage generated between the DC output terminals T(+) and T(−) results in, for either the internal surge or the external surge, the specified voltage of 30V which is twice as high as 15V of the Zener voltage.

The absorption energy per Zener diode in this embodiment is hereinafter compared with that in the conventional circuit shown in FIG. 1D.

Figure 3:
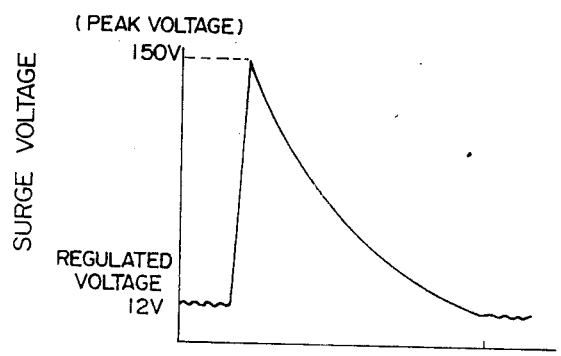
FIG. 3 is an example of a waveform of the typical load damping surge developed in a generator incorporating the circuits shown in FIG. 2.
Figure 4A:
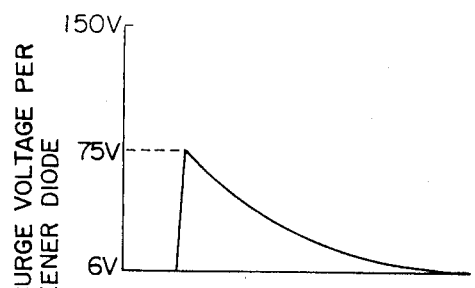
FIGS. 4A to 4C are waveforms of surge voltage, clamping voltage and surge current per Zener diode of the embodiment at the time when a load damping surge has developed.
Figure 5A:
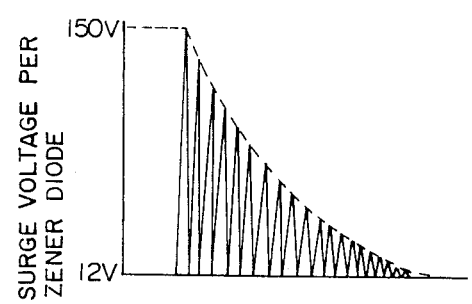
FIGS. 5A to 5C are waveforms of the surge voltage, clamping voltage and surge current per one Zener diode in the conventional circuit shown in FIG. 1D at the time when the same load damping surge as shown in FIG. 3 has developed.
Figure 4B:
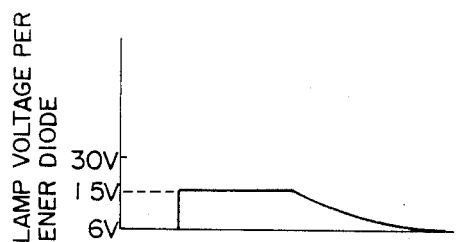
Figure 5B:
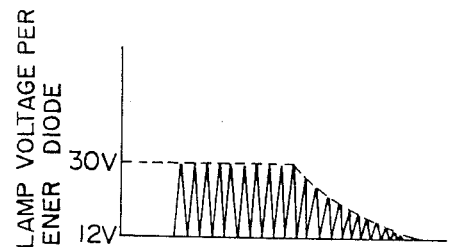
Figure 4C:
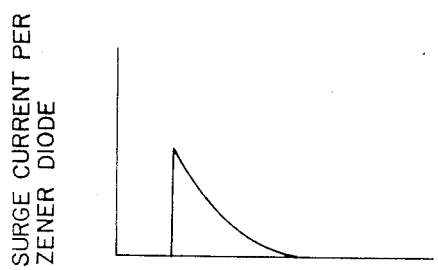
Figure 5C:
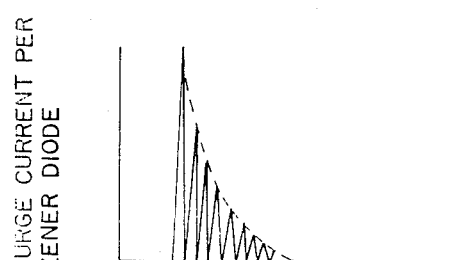

FIG. 3 is the voltage waveform of a typical load damping surge with a peak voltage of 150V (observed between the DC output terminals T(+) and T(−)). When such an internal surge develops, the surge voltage per Zener diode has waveforms shown in FIGS. 4A and 5A. Since the surge voltage in the embodiment is divided into two levels by Zener diodes ZD7 and ZD8, the surge voltage per Zener diode has the waveform with a peak voltage of 75V as shown in FIG. 4A. On the other hand, since the surge voltage in the conventional circuit shown in FIG. 1D is divided at each phase and applied to Zener diodes ZD2, ZD4 and ZD6 in each phase, the surge voltage per Zener diode has the waveform with a peak voltage of 150V as shown in FIG. 5A. FIGS. 4B and 5B represent the clamping voltage per Zener diode of this embodiment and of the conventional circuit, respectively. Because the clamping voltage per Zener diode equals the Zener voltage and the Zener voltage in the embodiment is 15V as mentioned above, it can be shown as in FIG. 4B. On the other hand, since the surge voltage in the conventional circuit is clamped by one Zener diode in each phase as mentioned above, it is necessary to set the Zener voltage to 30V to specify the clamping voltage to 30V as in the embodiment. Thus the clamping voltage per Zener diode in the conventional circuit takes the waveform shown in FIG. 5B. FIGS. 4C and 5C show the surge currents flowing through one Zener diode. These waveforms are similar to the waveforms obtained by deducting the voltage waveforms of FIGS. 4B and 5B from the voltage waveforms of FIGS. 4A and 5A, respectively.

The absorption power per Zener diode can be obtained by deducting the voltage of FIGS. 4B and 5B from the voltages of FIGS. 4A and 5A, and then by multiplying the remainders by the currents of FIGS. 4C and 5C, respectively. The absorption energy per Zener diode can be obtained by integrating this absorption power with time. The thus calculated absorption energy per Zener diode for the embodiment is ½ of the total energy of the surges, and that for the conventional circuit is ⅓. These results could be easily preestimated from the fact that the embodiment uses two Zener diodes and the conventional circuit uses three Zener diodes to absorb surges.

Destruction of a Zener diode is caused by absorption peak power rather than absorption energy (absorption power). Instantaneous absorption energy at the time the surge voltage reaches its peak level causes the destruction of a Zener diode. The peak power per Zener diode in the embodiment is described below in detail in comparison with the conventional circuit shown in FIG. 1D.

To simplify the explanation, models shown in FIGS. 6 and 7 are introduced for the embodiment and the conventional circuit, respectively. FIG. 6A is an equivalent circuit used for the embodiment and FIG. 7A is that for the conventional circuit. In the figures, R is the resistance value per phase of stator coil of the generator SG and is assumed as 1.5Ω. The waveforms of the surge voltage applied to the Zener diodes are assumed as square waves shown in FIGS. 6B and 7B, and the levels are assumed to be 75V for the embodiment as shown in FIG. 6B and 150V for the conventional circuit as shown in FIG. 7, in accordance with the above considerations.

The peak power Pp per Zener diode based on the thus simplified models can be calculated using the following equations;

Embodiment: $Pp = (75V - Vz1)/1.5\Omega \times Vz1$ (1)

where: Vz1 (Zener voltage) = 15V

Conventional circuit: $Pp = (150V - Vz2)/3\Omega \times Vz2$ (2)

where: Vz2 (Zener voltage) = 30V

Figure 8:
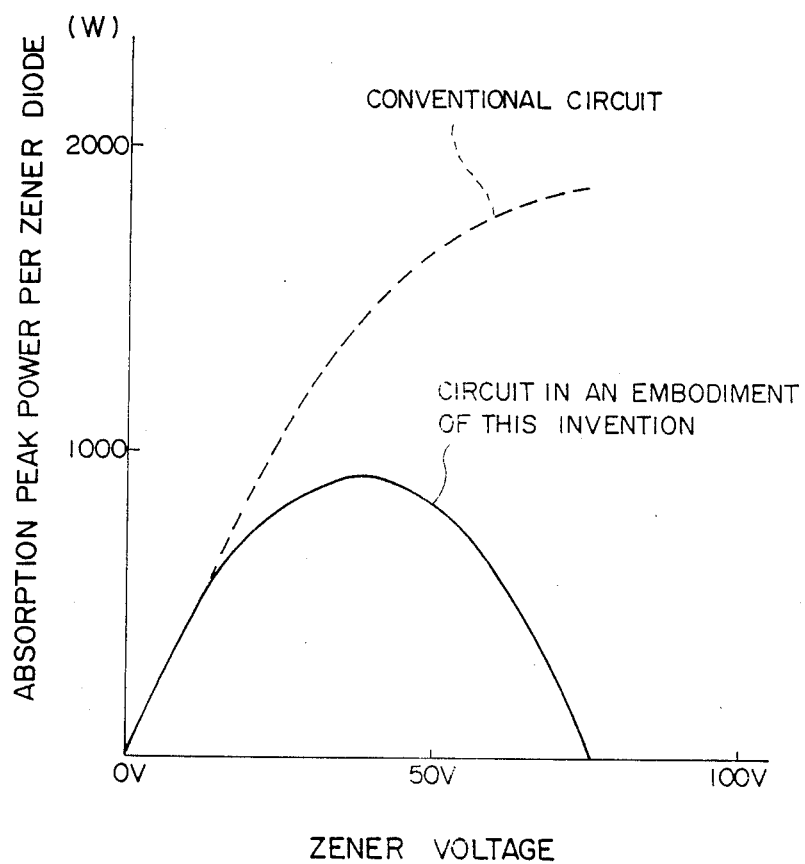
FIG. 8 is the characteristic curve of the absorption peak power per Zener diode in the conventional circuit in FIG. 1D and in the embodiment in relation to the Zener voltage.

The peak power per Zener diode calculated by the above equations is 600W for the embodiment and 1200W for the conventional circuit. FIG. 8 shows the absorption peak voltage obtained at different Zener voltages. In the figure, the solid line represents the results of the embodiment and the broken line represents that of the conventional circuit. When the results of the embodiment are compared with those of the conventional circuit under the same clamping voltage conditions, it should be noted that the Zener voltage of the embodiment equals half that of the conventional circuit. As clearly shown in the figure, the peak power per Zener diode of the embodiment is considerably lower than that of the conventional circuit when they are under the same clamping voltage conditions. In other words, even if the Zener diode used has the same capacity as that used in the conventional circuit, the embodiment can withstand a considerably higher surge voltage than that which the conventional circuit withstands.

As for external surges, a model similar to FIG. 6A. can be used in common because both in the embodiment and in the conventional circuit shown in FIG. 1D, surges are absorbed by two Zener diodes in series connection. It should also be noted that the Zener voltage of the embodiment reduces by half the Zener voltage of the conventional circuit in the internal surge described above when they are under the same clamping voltage conditions as assumed for the internal voltage (main surges). The calculation results on the external surge on the basis of the model prove that the absorption peak power per Zener diode of the embodiment reduces by about half the absorption peak power of the conventional circuit as in the internal surge. Therefore, the resistance against surges of the external circuit in the embodiment will increase considerably when the Zener diodes to be used have the same capacity as those used in the conventional circuit.

It should be understood that the scope of this invention is not limited to the above embodiments, and that those skilled in the art may make various changes and modifications in application without departing from the spirit and the scope of the invention as hereinafter claimed.

What is claimed is:

1. A polyphase full-wave rectifying circuit to be connected to a polyphase AC line having a neutral point, the circuit comprising:

DC outlet terminals; and a plurality of paris of rectifying elements, each pair including two rectifying elements in a series connection, the pairs connected in parallel with each other between the DC output terminals, one of the paris including a pair of Zener type rectifying elements having an interconnection point to be connected to the neutral point of the polyphase AC line and the other pairs being pairs of ordinary type rectifying elements having interconnection points to be connected to phase points of the polyphase AC line.

* * * * *